(12) United States Patent
Maier et al.

(10) Patent No.: US 6,526,003 B1
(45) Date of Patent: Feb. 25, 2003

(54) PLAYBACK DEVICE FOR DISC-SHAPED RECORDING MEDIA

(75) Inventors: Jens Maier, Giessen (DE); Holger Zimmermann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,731

(22) PCT Filed: Jan. 22, 1999

(86) PCT No.: PCT/DE99/00148

§ 371 (c)(1),
(2), (4) Date: Oct. 20, 2000

(87) PCT Pub. No.: WO99/40582

PCT Pub. Date: Aug. 12, 1999

(30) Foreign Application Priority Data

Feb. 5, 1998 (DE) .......................................... 198 04 541

(51) Int. Cl.[7] .............................................. G11B 21/08
(52) U.S. Cl. ................................ 369/30.08; 369/47.23; 369/30.27
(58) Field of Search ...................... 369/30.08, 30.27, 369/30.24, 30.07, 30.09, 30.36, 33.01, 47.23

(56) References Cited

U.S. PATENT DOCUMENTS

| | | | | |
|---|---|---|---|---|
| 5,257,253 A | * | 10/1993 | Otsubo et al. ................. | 369/48 |
| 5,420,839 A | * | 5/1995 | Tateishi ........................ | 369/32 |
| 5,428,592 A | | 6/1995 | Endo | |
| 5,841,742 A | * | 11/1998 | Tsukihashi et al. ............ | 369/33 |
| 5,870,355 A | * | 2/1999 | Fujihara ...................... | 369/32 |
| 6,055,216 A | * | 4/2000 | Shintani ...................... | 369/32 |
| 6,288,991 B1 | * | 9/2001 | Kajiyama et al. ........ | 369/47.23 |

FOREIGN PATENT DOCUMENTS

| | | |
|---|---|---|
| EP | 0 453 108 | 10/1991 |
| EP | 0 724263 | 7/1996 |
| JP | 08 036829 | 6/1996 |
| JP | 09 306088 | 2/1998 |

* cited by examiner

Primary Examiner—Tan Dinh
(74) Attorney, Agent, or Firm—Kenyon & Kenyon

(57) ABSTRACT

A playback device for disk-shaped recording media is proposed, which makes it possible to skip over storage data groups on audio disks. The playback device includes a scanning device and a device for evaluating content data recorded in a start-up area on the recording medium. The recording medium inserted in the playback device is recognized as a storage disk or as an audio disk, depending on the evaluation of the content data. In the event that a storage disk is recognized, a playback process is terminated, and in the event an audio disk is recognized, the scanning device skips to a just addressed title of the audio disk. The scanning device, during the playback of a title of the audio disk, scans coded supplemental information data recorded with respect to this title. The evaluation device, on the basis of the supplemental information, recognizes whether the title just played is an audio data group or a storage data group. In the event that a storage data group is recognized, the scanning device skips to a different title.

5 Claims, 1 Drawing Sheet

Fig. 1
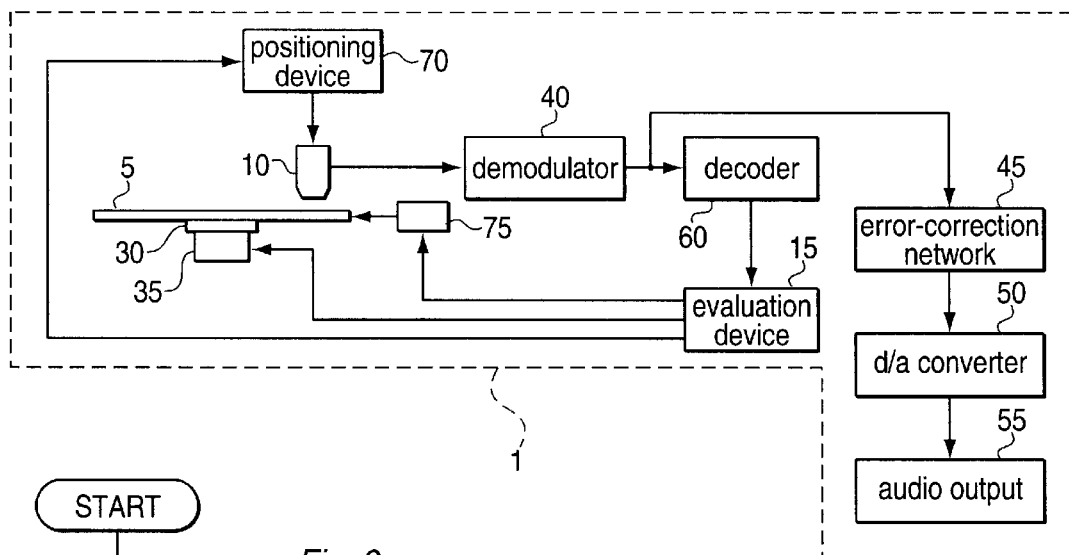
Fig. 2
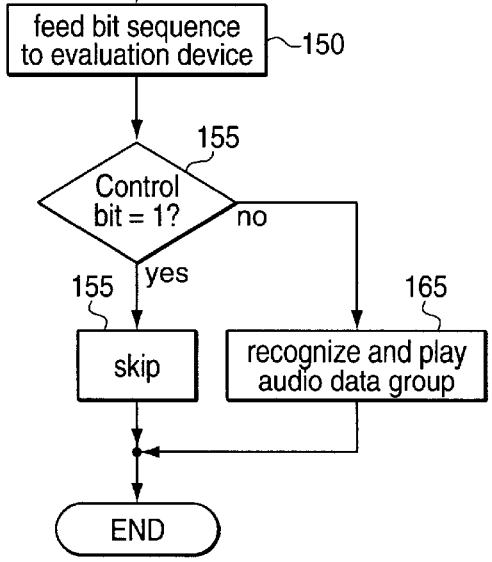
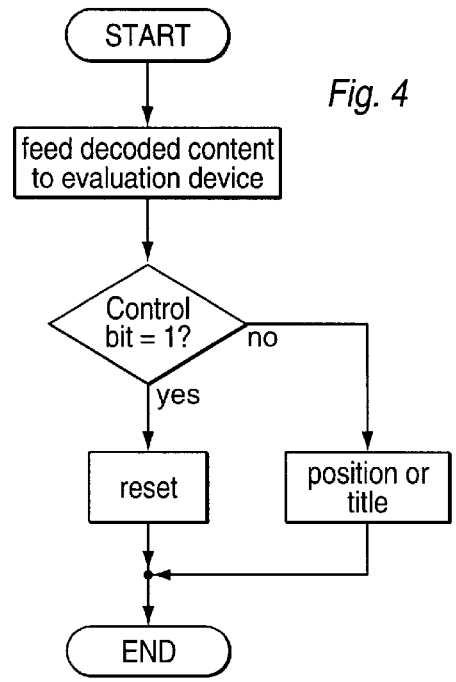
Fig. 4
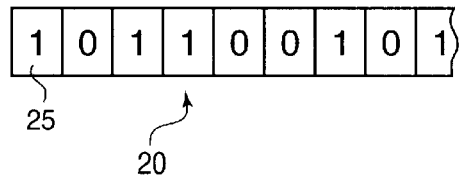
Fig. 3

PLAYBACK DEVICE FOR DISC-SHAPED RECORDING MEDIA

BACKGROUND INFORMATION

The present invention relates to a playback device for disk-shaped recording media.

From European Patent No. 0 453 108, a record player for a sound disk and a storage disk is described, which is capable of playing both an audio disk as well as a storage disk. The record player includes a scanning device and an evaluation device for determining whether a disk is an audio disk or a storage disk. In addition, the record player includes a means for beginning the playback of the music of a preselected musical piece, if the evaluation device recognizes the disk as an audio disk. The means also functions to set a pause mode if the evaluation device recognizes the disk as a storage disk. The decision of the evaluation device, as to whether the disk is an audio disk or a storage disk, is based on information that is read out from a start-up area on the disk.

SUMMARY OF THE INVENTION

In contrast, the playback device according to the present invention has the advantage that storage data groups recorded on an audio disk are recognized on the basis of supplemental information recorded on the audio disk and are skipped by the scanning device. In this manner, a noise-producing playback of storage data groups on audio disks is prevented and, in addition, the time required for this playback is saved. Thus, the listening pleasure of the user is not impaired by the disturbing and time-consuming playback of storage data groups. Therefore, using the playback device according to the present invention, the result is a more rapid access to the actual audio data groups that are intended for playback.

In this context, it is particularly advantageous that a storage data group is marked by a binary symbol at the beginning of the coded supplemental information recorded with respect to this storage data group, and that the evaluation device recognizes a storage data group after evaluating the binary symbol. In this manner, storage data groups that have just been scanned can be recognized particularly rapidly and can be skipped. In this manner, the loss of time resulting from scanning a storage data group is further reduced.

A further advantage lies in the fact that the evaluation device recognizes a recording medium as an audio disk if at least one audio data group is recorded on the recording medium. In this manner, the refusal of the playback device to play back recording media having only relatively small proportion of audio data is prevented.

A further advantage lies in the fact that, in the event that the evaluation device recognizes the recording medium as a storage disk, a drive motor for the rotational drive of the recording medium switches off, and a scanning device returns to its initial position. In this manner, energy is saved, since the playback of storage disks is not required by the playback device. In addition, in this manner, the user recognizes that the recording medium inserted is not accepted by the playback device.

A further advantage lies in the fact that, in the event that the evaluation device recognizes a recording medium as a storage disk, the additional result is the ejection of the recording medium from the playback device. In this manner, the refusal by the playback device of the recording medium inserted is even more clearly signaled to the user, and the ease of use is increased since the user can remove the recording medium immediately from the playback device without any further operating processes.

BRIEF DESCRIPTION OF THE DRAWINGS

FIG. 1 shows a block diagram of a playback device according to the present invention.

FIG. 2 shows a flow chart for the operation of an evaluation device arranged in the payback device.

FIG. 3 shows the beginning of coded supplemental information assigned to a data group and recorded on the recording medium.

FIG. 4 shows another flow chart for the operation of an evaluation device arranged in the payback device.

DETAILED DESCRIPTION

In FIG. 1, 1 designates a playback device for disk-shaped recording media that is configured, for example, as a compact disk player. A disk-shaped recording medium 5 inserted into playback device 1 rests upon a turntable 30, which can be rotationally driven by a drive motor 35. Disk-shaped recording medium 5 can be an audio disk or a storage disk. In this context, an audio disk is understood to be a recording medium on which audio signals for acoustical reproduction are recorded. This can be, for example, a contact disk having recorded music titles. If recording medium 5 is a storage disk, then it can be, for example, a CD-ROM. In this context, the data are recorded in the form of individual data groups or titles on disk-shaped recording medium 5, it being a question of audio data groups in the case of an audio disk and of storage data groups in the case of a storage disk. Playback device 1 includes a scanning device 10 for scanning data recorded on a recording medium 5 inserted into playback device 1. The recording media cited by way of example are optical disks having digitally recorded data, so that, in this case, scanning device 10 can scan an inserted recording medium 5 using a laser beam in a manner that is familiar to the worker skilled in the art. Disk-shaped recording medium 5, in this context, has a start-up area, which in the beginning is scanned by scanning device 10 and which contains content data, which constitute information concerning the data groups stored on recording medium 5.

The recordings of recording medium 5 scanned by scanning device 10 are fed to a demodulator 40 and are demodulated there. Subsequently, an error correction takes place in an error-correction network 45, and a digital/analog conversion of the error-corrected data takes place in a digital/analog converter 50. The analog data are then fed to an audio output 55, from which they can be fed to an acoustical playback device, for example, to a speaker, optionally, after further preprocessing. The scanned data demodulated by demodulator 40 are also fed to a decoder 60, which decodes the scanned content data and the coded supplemental information of recording medium 5 and feeds them to an evaluation device 15. Evaluation device 15 in turn controls drive motor 35, a positioning device 70, and an ejection device 75. Positioning device 70 functions to position scanning device 10 in the area of recording medium 5, and ejection device 75 functions to eject, for example, a recording medium 5 inserted via an input tray into playback device 1 from this input tray, for the removal of recording medium 5 from playback device 1.

After the insertion of recording medium 5 into the input tray of playback device 1 and after the setting of a playback mode by the user at an input unit not depicted in FIG. 1, scanning device 10 is moved by positioning device 70 to the start-up area of recording medium 5. There, the content data are scanned by scanning device 10 and are fed via demodulator 40 to decoder 60. The content data, in this context, exist in the form of a so-called subcode in the start-up area of recording medium 5. The content data in the start-up area of recording medium 5 represent a directory of the titles or data groups recorded on recording medium 5. In this context, each data group in the start-up area of recording medium 5 has assigned to it at least one bit sequence 20 in accordance with FIG. 3, which includes the start address of the data groups on recording medium 5 and, optionally, further information concerning the associated data groups recorded on recording medium 5, such as the play time. In this context, each bit sequence 20 is preceded by a control bit 25, which marks the associated data group as an audio data group or as a storage data group. Thus, as a result of a control bit 25 of bit sequence 20, set at a logical One as in FIG. 3, the associated data group is designated, for example, as a storage data group. An audio data group is then marked by a logical Zero of control bit 25. Decoder 60 decodes scanned bit sequences 20 and transmits the decoded information to evaluation device 15. Evaluation device 15 checks as to whether at least one audio data group is recorded on recording medium 5 and, if this is the case, recognizes recording medium 5 as an audio disk. Otherwise, recording medium 5 is recognized as a storage disk. If recording medium 5 is recognized as an audio disk, then the playback process is continued, and positioning device 70 positions scanning device 10 at the beginning of a title that is preselected, for example, by programming. If recording medium 5 has been recognized as a storage disk, then positioning device 70 returns scanning device 10 to its initial position. In addition, drive motor 35 is turned off so that the rotation of recording medium 5 is terminated. In addition, using ejection device 75, an ejection of recording medium 5 from the input tray of playback device 1 is effected, so that the user can remove recording medium 5 from playback device 1. In FIG. 4, a flowchart is depicted, which describes the mode of functioning of evaluation device 15 in evaluating the content data. At one program point 100, the decoded content data are fed to evaluation device 15. At program point 105, evaluation device 15 checks as to whether all control bits 25 of bit sequence 20 are set at a logical One. If this is the case, then a branching occurs to program point 110, which otherwise occurs to program point 115. At program point 110, evaluation device 15 causes positioning device 70 to reset scanning device 10 in the initial position. In addition, evaluation device 15 causes drive motor 35 to switch off. In addition, it can be provided that evaluation device 15 at program point 110 also causes ejection device 75 to eject recording medium 5 from input tray of playback device 1 for removal. At program point 110, evaluation device 15 has therefore recognized recording medium 5 as a storage disk. At program point 115, evaluation device 15 has recognized recording medium 5 as an audio disk and causes positioning device 70 to position scanning device 10 on the title just addressed of the audio disk. This can be, for example, a title programmed by the user at the input unit undepicted in FIG. 1 or the recorded title of recording medium 5 closest to the start-up area. Then this title is played. After program point 110, or after program point 115, the program is exited.

In the event that a recording medium 5 inserted in playback device 1 has been recognized by evaluation device 15 as a storage disk, the playback process is terminated. If recording medium 5 has been recognized as an audio disk, then the playback process is continued. A recording medium 5 recognized as an audio disk, however, can include storage data groups. The data groups of recording medium 5 have associated to them coded supplemental information, also in the form, in each case, of a bit sequence 20 as in FIG. 3, and the supplemental information is recorded on recording medium 5 together with the associated data groups. In this context, the first bit of the specific bit sequence 20 can also act as control bit 25 and can designate the associated data group as a storage data group or as an audio data group. In this context, a control bit 25 set at logical One can designate the associated data group as a storage data group and a control bit 25 set at Zero can designate the associated data group as an audio data group. Coded supplemental information 20, in this context, is recorded on recording medium 5 at least at the beginning of each title. It is also fed to decoder 60 and after decoding is evaluated in evaluation device 15. Coded supplemental information 20, however, can also be repeatedly arranged within the associated data group. If scanning device 10 is therefore positioned by positioning device 70 at the beginning of a title or at a location within the data group, then, without greater loss of time, associated bit sequence 20 is fed to decoder 60, is decoded by decoder 60, and is fed to evaluation device 15.

In FIG. 2, a flowchart is depicted, which describes the mode of functioning of evaluation device 15 for the evaluation of bit sequences 20 of this type assigned to the data groups. At a program point 150, corresponding bit sequence 20 associated to a data group, after being decoded by decoder 60, is fed to evaluation device 15. At program point 155, a check test is run as to whether control bit 25 is set at logical One. If this is the case, then a branching occurs to program point 160, which otherwise occurs to program point 165. At program point 160, evaluation device 15 causes positioning device 70 to skip over the actual title or the actual data group and causes scanning device 10 to be positioned at the beginning of a different title or of a different data group, this title being able to be preselected by the user, for example, through programming in the input unit undepicted in FIG. 1, or being able to be the title recorded next on recording medium 5. At program point 160, in any case, the currently scanned data group has been recognized as a storage data group. At program point 165, the currently scanned data group is recognized as an audio data group and is played. After program point 160 or after program point 165, the program, in each case, is exited.

By skipping over storage data groups on audio disks, the listening pleasure for the user is not impaired and the time for playing back the storage data group is saved. Thus, a more rapid access to the actual audio data groups is possible.

Recording media 5 configured as compact disks, in a pause before the first title, include at least one storage data group. These data groups, in this context, are associated to the first title, are therefore not marked separately using coded supplemental information, and therefore cannot be recognized by evaluation device 15. However, since the content data in the start-up area of compact disk 5 contain, as the addresses of the individual titles, their starting times, the storage data groups, in the pause before the first title, are automatically skipped over by scanning device 10, since the starting addresses directly mark the specific beginning of the title, excluding the previous pause. Thus, even in compact disks 5 of this type, there is no impairment of the listening pleasure for the user by the playback of storage data groups that is acoustically perceptible as noise, and the loss of time associated therewith until the playback of the first title is eliminated.

Audio disks having storage data groups and audio data groups are known, for example, as so-called mix-mode CDs.

As a result of the fact that control bit 25, in each case, stands at the beginning of the corresponding bit sequence both in the case of content data as well as in the case of coded supplemental information, a particularly rapid recognition of a recording medium 5 as storage disk is possible or of a data group as a storage data group, since this control bit 25, in sequential processing, is evaluated by evaluation device 15 first.

What is claimed is:

1. A playback device for a disk-shaped recording medium, comprising:

a scanning device;

an evaluation device for evaluating content data recorded in a start-up area on the recording medium; and an arrangement for recognizing the recording medium inserted into the playback device as one of a storage disk and an audio disk depending upon the evaluation of the content data, wherein if the storage disk is recognized, a playback is terminated, and if the audio disk is recognized, the scanning device skips to a title of the audio disk;

wherein:

the scanning device, during the playback of the title of the audio disk, scans coded supplemental information recorded with respect to the title, the evaluation device recognizes whether the played-back title is one of an audio data group and a storage data group based on the coded supplemental information, and if the storage data group is recognized, the scanning device skips to a different title.

2. The playback device of claim 1, wherein the storage data group is marked by a binary symbol at a beginning of the coded supplemental information recorded with respect to the storage data group, and wherein the evaluation device recognizes the storage data group based on an evaluation of the binary symbol.

3. The playback device of claim 1, wherein the evaluation device recognizes the recording medium as the audio disk if at least one audio data group is recorded on the recording medium.

4. The playback device of claim 1, wherein if the evaluation device recognizes the recording medium as the storage disk, a drive motor for rotating the recording medium switches off and the scanning device returns to an initial position.

5. The playback device of claim 4, wherein an ejection of the recording medium takes place from the playback device.

* * * * *

UNITED STATES PATENT AND TRADEMARK OFFICE
CERTIFICATE OF CORRECTION

PATENT NO. : 6,526,003 B1
DATED : February 25, 2003
INVENTOR(S) : Jens Maier et al.

Page 1 of 1

It is certified that error appears in the above-identified patent and that said Letters Patent is hereby corrected as shown below:

Title page, Item [54] and Column 1, lines 1-2,
Change the title from "PLAYBACK DEVICE FOR DISC-SHAPED RECORDING MEDIA" to -- DISK DEVICE CAPABLE OF PLAYING BACK AUDIO DISC AND STORAGE DISC --

Column 2,
Lines 11 and 16, change "payback device" to -- playback device --
Line 28, change "contact disk" to -- compact disk --

Signed and Sealed this

First Day of June, 2004

JON W. DUDAS
*Acting Director of the United States Patent and Trademark Office*